United States Patent
Kuge et al.

(10) Patent No.: US 9,790,843 B2
(45) Date of Patent: Oct. 17, 2017

(54) UNIFLOW SCAVENGING 2-CYCLE ENGINE

(71) Applicant: IHI Corporation, Tokyo (JP)

(72) Inventors: Takahiro Kuge, Tokyo (JP); Yutaka Masuda, Tokyo (JP); Takayuki Yamada, Tokyo (JP); Takeshi Yamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 94 days.

(21) Appl. No.: 14/935,889

(22) Filed: Nov. 9, 2015

(65) Prior Publication Data

US 2016/0061097 A1    Mar. 3, 2016

Related U.S. Application Data

(63) Continuation of application No. PCT/JP2014/062453, filed on May 9, 2014.

(30) Foreign Application Priority Data

May 10, 2013  (JP) ................. 2013-100529

(51) Int. Cl.
  *F02B 25/04*    (2006.01)
  *F02D 19/10*    (2006.01)
  (Continued)

(52) U.S. Cl.
  CPC .............. *F02B 25/04* (2013.01); *F02B 75/02* (2013.01); *F02D 19/10* (2013.01);
  (Continued)

(58) Field of Classification Search
  CPC .... F02B 25/04; F02B 75/02; F02B 2075/025; F02M 21/0278; F02M 21/042; F02D 19/10; F02D 19/0647; Y02T 10/36; Y02T 10/32
  (Continued)

(56) References Cited

U.S. PATENT DOCUMENTS 4,682,570 A * 7/1987 Velencei ............... F02B 25/04
                                                   123/65 R
5,000,133 A * 3/1991 Kawamura ............ F02B 25/04
                                                   123/65 VC (Continued)

FOREIGN PATENT DOCUMENTS

| JP | 54-72306 A | 6/1979 |
| JP | 3908855 B2 | 4/2007 |
| JP | 2012-154189 A | 8/2012 |
| JP | 2012-167666 A | 9/2012 |
| JP | 2013-234596 A | 11/2013 |
| JP | 5480961 B1 | 4/2014 |
| WO | 2009/064971 A1 | 5/2009 |

OTHER PUBLICATIONS

International Search Report dated Jun. 10, 2014 in PCT/JP2014/062453 (with an English translation) (4 pages).

*Primary Examiner* — Marguerite McMahon
(74) *Attorney, Agent, or Firm* — Rothwell, Figg, Ernst & Manbeck, P.C.

(57) ABSTRACT

A uniflow scavenging 2-cycle engine includes a cylinder inside which a combustion chamber is formed; a piston which slides within the cylinder; a scavenge port which is provided on one end side in a stroke direction of the piston in the cylinder to suck an active gas into the combustion chamber in accordance with the sliding movement of the piston; and a fuel injection unit which has an injection port located on the outside of the cylinder, and injects the fuel gas into the active gas sucked into the scavenge port.

2 Claims, 4 Drawing Sheets

(51) Int. Cl.
    *F02M 21/04*       (2006.01)
    *F02M 21/02*       (2006.01)
    *F02D 19/06*        (2006.01)
    *F02B 75/02*        (2006.01)

(52) U.S. Cl.
    CPC ...... *F02M 21/0278* (2013.01); *F02M 21/042* (2013.01); *F02B 2075/025* (2013.01); *F02D 19/0647* (2013.01); *Y02T 10/32* (2013.01); *Y02T 10/36* (2013.01)

(58) Field of Classification Search
    USPC ............ 123/73 R, 73 C, 65 P, 74 AC, 65 A, 123/65 VC, 65 PE
    See application file for complete search history.

(56) References Cited

U.S. PATENT DOCUMENTS

| | | | |
|---|---|---|---|
| 5,870,982 | A | 2/1999 | Strawz |
| 6,062,178 | A * | 5/2000 | Meyers ................... F02B 25/02 |
| | | | 123/336 |
| 2002/0148451 | A1 | 10/2002 | Yamamoto et al. |
| 2012/0318226 | A1 * | 12/2012 | Stone ...................... F02B 25/04 |
| | | | 123/1 A |
| 2015/0075485 | A1 | 3/2015 | Yamada et al. |
| 2015/0167537 | A1 | 6/2015 | Masuda et al. |
| 2015/0167538 | A1 | 6/2015 | Masuda et al. |
| 2015/0176475 | A1 | 6/2015 | Masuda et al. |
| 2015/0260115 | A1 | 9/2015 | Masuda et al. |
| 2016/0061098 | A1 | 3/2016 | Kuge et al. |
| 2016/0061099 | A1 | 3/2016 | Kuge et al. |

* cited by examiner

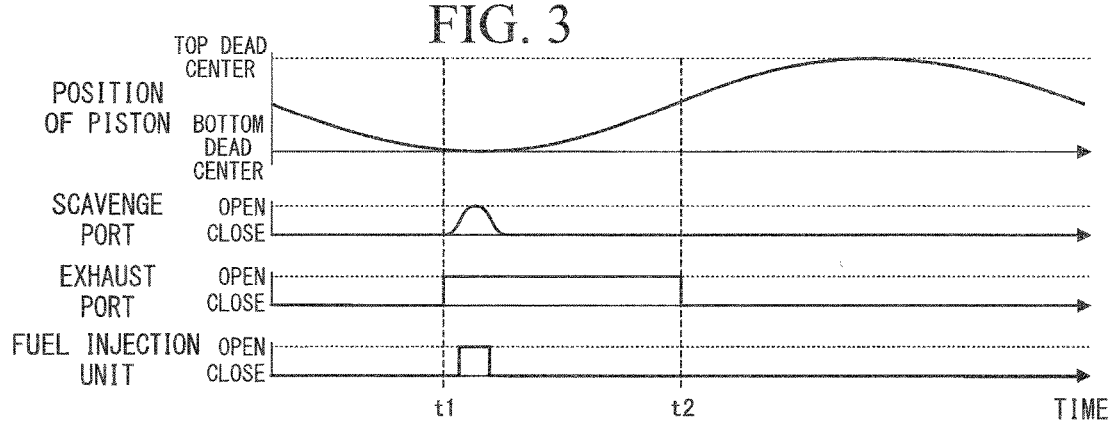
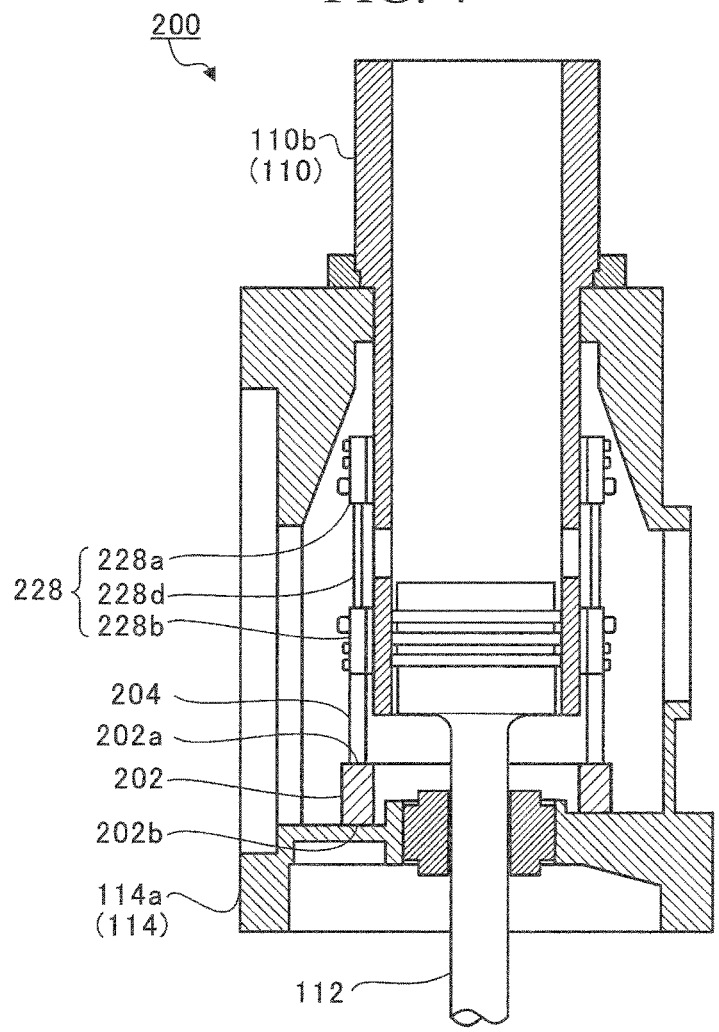

UNIFLOW SCAVENGING 2-CYCLE ENGINE

This application is a continuation application based on a PCT Patent Application No. PCT/JP2014/062453, filed on May 9, 2014, whose priority is claimed on Japanese Patent Application No. 2013-100529, filed on May 10, 2013. The contents of both the PCT Application and the Japanese Application are incorporated herein by reference.

TECHNICAL FIELD

The present disclosure relates to a uniflow scavenging 2-cycle engine which combusts a premixed gas generated by injecting a fuel gas into an active gas sucked from a scavenge port.

BACKGROUND ART

In a uniflow scavenging 2-cycle engine (a 2-stroke engine) which is also used as an engine of a vessel, a scavenge port is provided in an end portion in a stroke direction of a piston of a cylinder, and an exhaust port is provided on the other end portion side in the stroke direction of the piston of the cylinder. When an active gas is sucked into a combustion chamber from the scavenge port in an intake (air supply) stroke, the exhaust gases generated by the combustion operation are exhausted by being pushed out of the exhaust port by the sucked active gas. At this time, a premixed gas is generated by injecting the fuel gas into the sucked active gas, the combustion operation is performed by compressing the generated premixed gas, and the piston reciprocates within the cylinder by the explosive pressure generated by the combustion operation.

In such a uniflow scavenging 2-cycle engine, when the mixing between the fuel gas and the active gas is insufficient, the concentration of the fuel gas locally increases, and there are problems such as pre-ignition and emission of an unburned gas. Therefore, for example, as disclosed in Patent Document 1, a communicating hole is provided in an inner wall of the scavenge port, and a nozzle tube protrudes into the scavenge port from the communicating hole. Moreover, there is disclosed a technique for securing the mixing time of the fuel gas and the active gas within the cylinder, by injecting the fuel gas into the scavenge port from the nozzle tube, and by starting the mixing between the active gas and the fuel gas before the active gas is sucked into the cylinder.

CITATION LIST

Patent Document

[Patent Document 1]
  Japanese Patent No. 3908855

SUMMARY

Technical Problem

However, in the configuration of Patent Document 1, as the communicating hole is provided in the inner wall of the scavenge port, the strength of the inner wall of the scavenge port is decreased. Also, when a plurality of scavenge ports are provided, the thickness of the partition wall between the adjacent scavenge ports becomes thinner to increase the width of the scavenge ports. Therefore, depending on a position where the communicating hole is provided, in addition to a decrease in the strength of the partition wall of the scavenge port, it is difficult to perform even a machining which provides the communicating hole in the partition wall of the scavenge port.

The present disclosure has been made in view of such problems, and an object thereof is to provide a uniflow scavenging 2-cycle engine capable of achieving a configuration which injects the fuel gas into an active gas flowing from the scavenge port by a simple machining, without decreasing the strength of the inner wall of the scavenge port.

Solution to Problem

In order to solve the above-mentioned problems, according to a first aspect of the present disclosure, there is provided a uniflow scavenging 2-cycle engine which includes a cylinder in which a combustion chamber is formed; a piston which slides within the cylinder; a scavenge port which is provided on one end side in a stroke direction of the piston in the cylinder to suck an active gas into the combustion chamber in accordance with the sliding movement of the piston; and a fuel injection unit which has an injection port located on the outside of the cylinder, and injects the fuel gas into the active gas sucked into the scavenge port.

Advantageous Effects

According to the uniflow scavenging 2-cycle engine of the present disclosure, since the fuel injection unit is provided so that its injection port is located on the outside of the cylinder, a configuration which injects the fuel gas into the active gas flowing from the scavenge port can be achieved by a simple machining, without decreasing the strength of the inner wall of the scavenge port.

BRIEF DESCRIPTION OF DRAWINGS

FIG. 3 is a diagram illustrating the operation of each control unit in the embodiment.

FIG. 4 is a diagram for illustrating a uniflow scavenging 2-cycle engine according to a second embodiment of the present disclosure.

DESCRIPTION OF EMBODIMENTS

Figure 1:
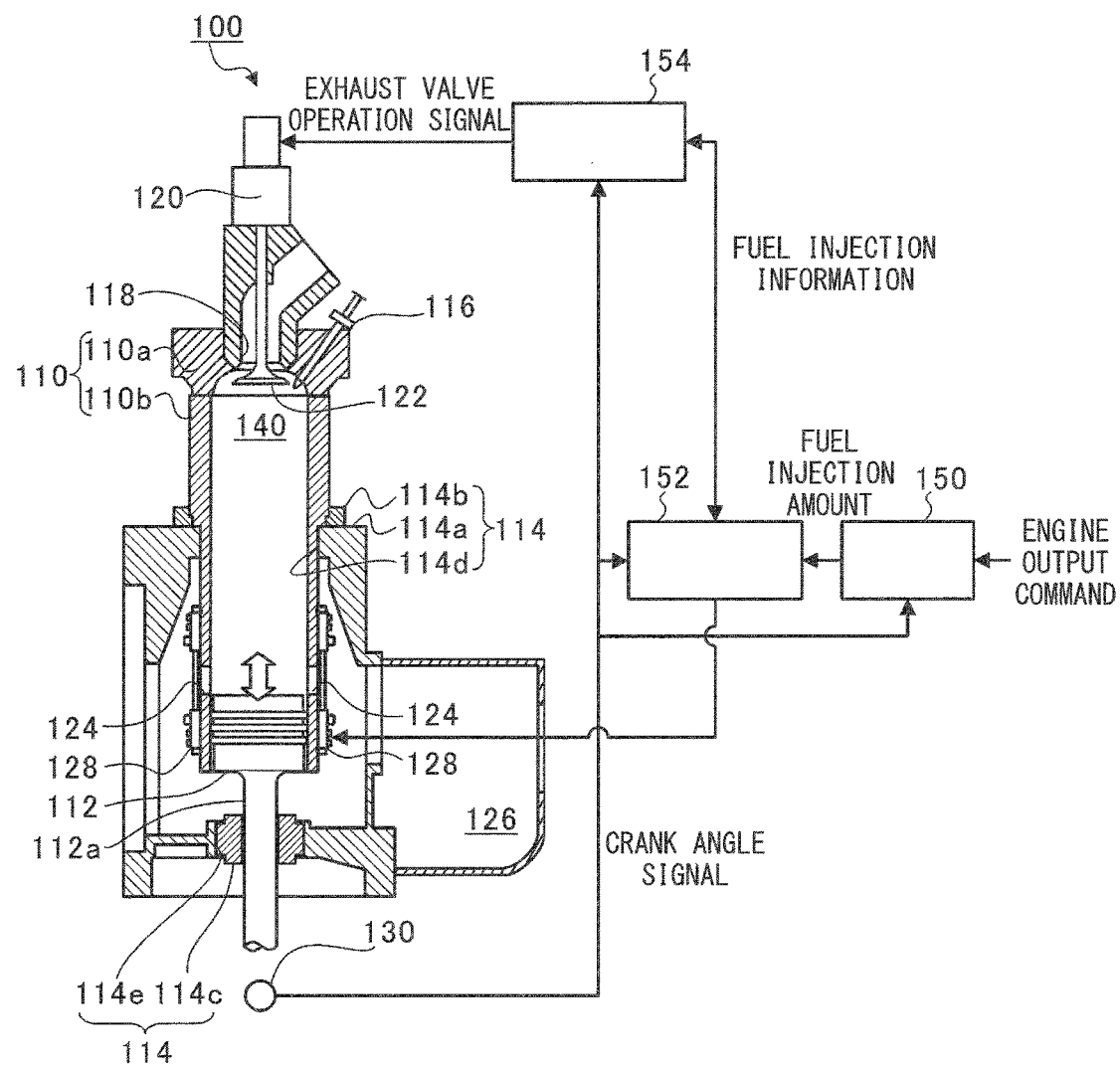
FIG. 1 is an explanatory diagram illustrating an overall configuration of a uniflow scavenging 2-cycle engine in a first embodiment of the present disclosure.

Hereinafter, embodiments of the present disclosure will be described in detail with reference to the accompanying drawings. Dimensions, materials, and other specific numerical values illustrated in these embodiments are merely examples for facilitating understanding of the present disclosure, and unless specifically indicated otherwise, the present disclosure is not limited thereto. In addition, in the present specification and drawings, the elements having substantially the same functions and configurations are denoted by the same reference numerals and the repeated description thereof will not be described. Further, the elements which are not directly related to the present disclosure will not be illustrated.

First Embodiment

FIG. 1 is a diagram illustrating an overall configuration of a uniflow scavenging 2-cycle engine 100 in a first embodiment of the present disclosure. The uniflow scavenging 2-cycle engine 100 of this embodiment, for example, is used in a vessel or the like. Specifically, the uniflow scavenging 2-cycle engine 100 is configured to include a cylinder 110 (a cylinder head 110a and a cylinder block 110b), a piston 112, a support unit 114, a pilot injection valve 116, an exhaust port 118, an exhaust valve driving device 120, an exhaust valve 122, a scavenge port 124, a scavenge chamber 126, a fuel injection unit 128, a rotary encoder 130 and a combustion chamber 140. The uniflow scavenging 2-cycle engine 100 is controlled by a control unit, such as a governor (a speed governor 150), a fuel injection control unit 152 and an exhaust control unit 154.

In the uniflow scavenging 2-cycle engine 100, the piston 112 connected to a crosshead (not illustrated) slidably reciprocates inside the cylinder 110 through four consecutive strokes, such as intake (air supply), compression, combustion and exhaust. In such a crosshead type piston 112, it is possible to form a relatively long stroke within the cylinder 110, and the crosshead can be subjected to the lateral pressure acting on the piston 112. Accordingly, it is possible to achieve a higher output of the uniflow scavenging 2-cycle engine 100. Further, since the cylinder 110 is spaced apart from a crank chamber (not illustrated) to which the crosshead is fitted, it is possible to prevent the fouling and deterioration of the crank chamber even when using a low-quality fuel oil.

The support unit 114 has a base 114a, a locking section 114b and a guide section 114c, and fixedly supports the cylinder 110. The base 114a is formed with a cylinder hole 114d into which the cylinder 110 is inserted, and a guide hole 114e into which the guide section 114c is inserted, and supports the overall load of the uniflow scavenging 2-cycle engine 100. The locking section 114b is fitted to a groove provided on an outer circumferential surface of the cylinder block 110b of the cylinder 110, and is located above the cylinder hole 114d to lock the cylinder 110 onto the upper surface of the base 114a. A rod 112a protruding from the piston 112 in the stroke direction is inserted into the guide section 114c to reduce the radial deviation of the piston 112.

The pilot injection valve 116 is provided in the cylinder head 110a above the top dead center of the piston 112 which is an end portion in the stroke direction of the cylinder 110 to inject an appropriate amount of fuel at a desired point in the engine cycle. Such fuel oil is naturally ignited by the heat of the combustion chamber 140 surrounded by the cylinder head 110a, a cylinder liner in the cylinder block 110b and the piston 112, and is combusted in a short time to significantly raise the temperature of the combustion chamber 140. Therefore, the premixed gas containing a fuel gas can be reliably combusted at a desired timing.

The exhaust port 118 is an opening provided on one end side in the stroke direction of the piston 112 in the cylinder 110, that is, on the top of the cylinder head 110a above the top dead center of the piston 112, and is open and closed to exhaust the exhaust gas after combustion occurring in the cylinder 110. The exhaust valve driving device 120 causes the exhaust valve 122 to vertically slide at a predetermined timing to open and close the exhaust port 118. Thus, the exhaust gas exhausted through the exhaust port 118 is supplied to a turbine side of a turbocharger (not illustrated), for example, and is exhausted to the outside.

The scavenge port 124 is a hole which passes through from an inner circumferential surface (an inner circumferential surface of the cylinder block 110b) of the other end (one end portion) side in the stroke direction of the piston 112 of the cylinder 110 to the outer circumferential surface, and a plurality of scavenge ports 124 are provided over the entire periphery of the cylinder 110 so as to be spaced apart from one another.

The scavenge port 124 sucks the active gas into the cylinder 110 in accordance with the sliding movement of the piston 112. Such an active gas includes oxygen, an oxidizing agent such as ozone or a mixed gas (e.g., air). The scavenge chamber 126 is filled with an inert gas (e.g., air) pressed by a compressor of a turbocharger (not illustrated), and the active gas is sucked from the scavenge port 124 under a differential pressure between the scavenge chamber 126 and the cylinder 110. Although the pressure of the scavenge chamber 126 can be substantially constant, when the pressure of the scavenge chamber 126 changes, a pressure gauge may be provided in the scavenge port 124 to control other parameters, such as an injection amount of the fuel gas, depending on the measured value.

Figure 2A:
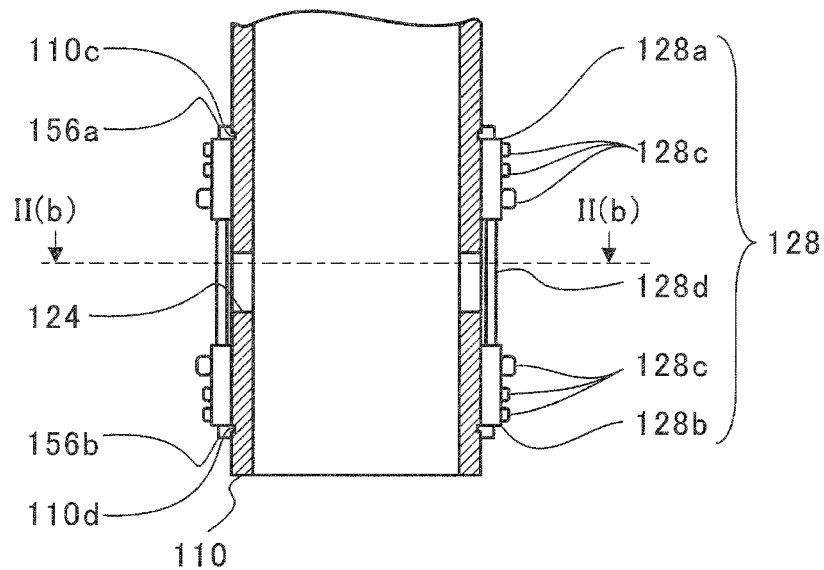
FIG. 2A is a cross-sectional view of a part of the cylinder and the fuel injection unit in the same cross-section as in FIG. 1 for illustrating the fuel injection unit.
Figure 2B:
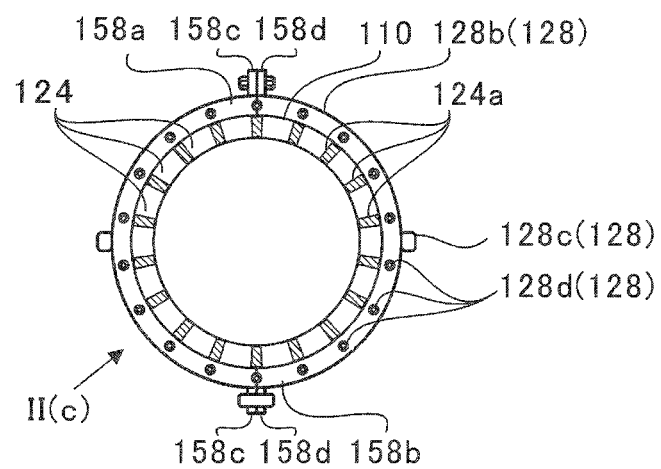
FIG. 2B is a cross-sectional view taken along the line II (b)-II (b) of FIG. 2A.
Figure 2C:
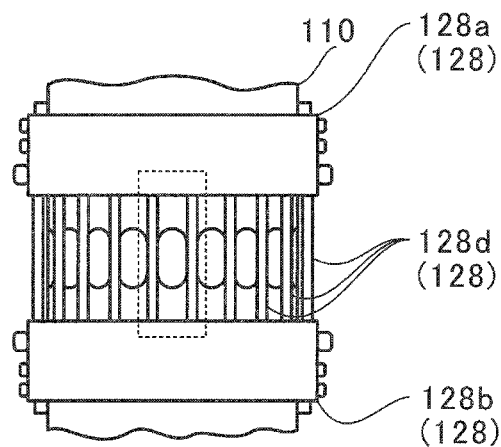
FIG. 2C is a view taken along an arrow II (c) of FIG. 2B.
Figure 2D:
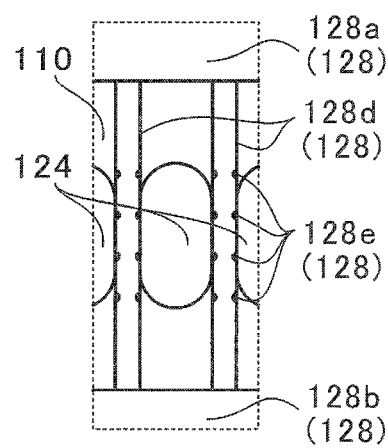
FIG. 2D is an enlarged view of a dashed line part of FIG. 2C.

FIGS. 2A to 2D are diagrams for describing a fuel injection unit 128, FIG. 2A illustrates a part of the cylinder 110 and the fuel injection unit 128 in the same cross-section as in FIG. 1, FIG. 2B illustrates a cross-section taken along the line II (b)-II (b) in FIG. 2A, and FIG. 2C illustrates a view taken along an arrow II (c) in FIG. 2B. Further, FIG. 2D illustrates an enlarged view of a broken line part of FIG. 2C. In FIGS. 2A to 2D, in order to facilitate understanding, the cross-sectional structure of the fuel injection unit 128 and the piston 112 are not illustrated.

As illustrated in FIG. 2A, the fuel injection unit 128 has mixing tubes 128a and 128b which are formed separately from the cylinder 110. Each of the mixing tubes 128a and 128b is an annular member which surrounds a radially outer side of the cylinder 110 in the circumferential direction. The mixing tube 128a is disposed further on the one end side (an upper side in FIG. 2A) in the stroke direction of the piston 112 than the scavenge port 124, and the mixing tube 128b is disposed further on the other end side (a lower side of FIG. 2A) in the stroke direction of the piston 112 than the scavenge port 124.

As illustrated in FIG. 2A, on the outer circumferential surface of the cylinder 110, a ring 156a is fitted to a groove 110c formed on the upper side of the mixing tube 128a, thereby restricting the upward movement of the mixing tube 128a by the ring 156a. Similarly, on the outer circumferential surface of the cylinder 110, a ring 156b is fitted to a groove 110d formed on the lower side of the mixing tube 128b, thereby restricting the downward movement of the mixing tube 128b by the ring 156b.

Further, as illustrated in FIG. 2B, the mixing tube 128b includes two members 158a and 158b which surround the cylinder 110 by half the circumference in the circumferential direction, and protrusions 158c and 158d provided at the respective both end portions of the members 158a and 158b are fastened by a chain and a nut (a so-called G-coupling). That is, the mixing tube 128b tightens the cylinder 110 from the outer circumferential side, and the vertical movement of the mixing tube 128b in FIG. 2A is also limited by the frictional force of a contact portion between the mixing tube 128b and the cylinder 110. Here, although the fixing means of the mixing tube 128b has been described, the mixing tube 128a is also fastened by the same structure as the mixing tube 128b.

A mixing chamber which annularly extends is formed on the inside of each of the mixing tubes 128a and 128b. Each mixing chamber communicates with a fuel pipe (not illustrated) through which the fuel gas obtained by gasifying a liquefied natural gas (LNG) flows, and an active pipe (not illustrated) through which the active gas flows through a switching valve 128c.

Moreover, the fuel gas from the fuel pipe is mixed with the active gas from the active pipe in the mixing chamber to generate a premixed gas. Here, as the fuel gas, it is possible to apply, for example, a gas obtained by gasifying a liquefied petroleum gas (LPG), light oil and heavy oil, without being limited to the LNG As illustrated in FIG. 2C, a circulation tube 128d is provided between the mixing tube 128a and the mixing tube 128b, and both ends are fixed to each of the mixing tube 128a and the mixing tube 128b. As illustrated in FIG. 2D, the circulation tube 128d is disposed for each partition wall 124a one by one, at a position which faces the partition wall 124a provided between the adjacent scavenge ports 124 (a position spaced apart from the partition wall 124a between the scavenge port 124 on the radially outer side of the cylinder 110), of the outer circumferential surface of the cylinder 110.

The circulation tube 128d includes a circulation tube communicating with the mixing tube 128a, and a circulation tube communicating with the mixing tube 128b, and these are alternately disposed in the circumferential direction of the cylinder 110. That is, one of the adjacent circulation tubes 128d communicates with the mixing tube 128a, and the other thereof communicates with the mixing tube 128b. Moreover, the premixed gas containing the fuel gas flowing from the mixing tube 128a or the mixing tube 128b flows through the circulation tube 128d.

As illustrated in FIG. 2D, an injection port 128e is formed in the circulation tube 128d. The injection port 128e is a hole through which the inner circumferential surface and the outer circumferential surface of the circulation tube 128d communicate with each other. That is, the injection port 128e is located on the radially outer side (the outer side of the cylinder 110) between the adjacent scavenge ports 124. In addition, the injection port 128e is open in a direction toward the circumferential direction of the cylinder 110 from the circulation tube 128d.

Moreover, when the switching valve 128c is open by receiving a command from a fuel injection control unit 152 to be described below, the premixed gas is ejected from the injection port 128e which is only open. Then, the premixed gas is sprayed from the injection port 128e of the fuel injection unit 128 toward the active gas, which flows from the scavenge chamber 126 toward the scavenge port 124. At this time, a vortex is generated in the active gas near the scavenge port 124, and it is possible to promote mixing between the active gas and the premixed gas by the vortex.

Further, in this embodiment, the fuel injection control unit 152 is provided on the radially outer side of the cylinder 110 separately from the cylinder 110. Therefore, it is possible to form the fuel injection unit 128 by a simple machining, without decreasing the strength of the partition wall 124a of the scavenge ports 124, and without requiring a high difficulty of machining the partition wall 124a of the scavenge port 124.

In addition, the circulation tube 128d formed with the injection port 128e is located on the radially outer side of the cylinder 110 between the adjacent scavenge ports 124. Therefore, it is possible to avoid a situation in which the circulation tube 128d disturbs the flow of the active gas circulating through the scavenge port 124.

Returning to FIG. 1, the rotary encoder 130 is provided on a crank mechanism (not illustrated) to detect an angle signal (hereinafter, referred to as a crank angle signal) of the crank.

The governor 150 derives an amount of fuel injection, based on the engine output command value input from the upper controller, and the engine rotational speed obtained by the crank angle signal from the rotary encoder 130, and outputs the derived amount of fuel injection to the fuel injection control unit 152.

The fuel injection control unit 152 controls the switching valve 128c (see FIG. 2A), based on information that indicates the derived amount of fuel injection input from the governor 150, and the crank angle signal from the rotary encoder 130.

The exhaust control unit 154 outputs an exhaust valve operating signal to the exhaust valve driving device 120, based on a signal relating to the amount of fuel injection from the fuel injection control unit 152, and the crank angle signal from the rotary encoder 130.

Hereinafter, the operation of each control unit in the engine cycle of the uniflow scavenging 2-cycle engine 100 will be described.

FIG. 3 is a diagram illustrating the operation of each control unit. As illustrated in FIG. 3, in the exhaust stroke after the combustion stroke, the exhaust port 118 and the scavenge port 124 are in the closed state, and the exhaust gas fills the combustion chamber 140 (within the cylinder 110).

When the piston 112 moves downward and approaches the bottom dead center, by the explosive pressure generated by the combustion action of the combustion chamber 140, the exhaust control unit 154 opens the exhaust valve 122 through the exhaust valve driving device 120, and the scavenge port 124 is open in accordance with the sliding operation of the piston 112 (0 illustrated in FIG. 3). Then, the active gas is sucked from the scavenge port 124.

Moreover, the fuel injection control unit 152 opens the switching valve 128c, based on the information indicating the derived amount of fuel injection input from the governor 150, and the engine rotational speed derived by the crank angle signal from the rotary encoder 130, thereby injecting the premixed gas to the radially outer side of the cylinder 110 of the scavenge port 124 from the fuel injection unit 128. Thus, the premixed gas is included in the active gas before being sucked into the scavenge port 124.

The premixed gas rises, while forming a swirl for promoting the mixing between the active gas and the fuel gas included in the premixed gas, and pushes out the exhaust gas of the combustion chamber 140 (within the cylinder 110) from the exhaust port 118.

In the compression stroke in which the piston 112 rises toward the top dead center from the bottom dead center, the fuel injection control unit 152 closes the switching valve 128c, and the injection of the fuel gas into the scavenge port 124 from the fuel injection unit 128 is stopped. Further, the scavenge port 124 is closed, and the suction of the active gas is stopped.

At this time, the exhaust control unit 154 maintains the exhaust valve 122 in the open state, and subsequently, the exhaust gas of the combustion chamber 140 (within the cylinder 110) is discharged from the exhaust port 118 by the ascent of the piston 112.

Thereafter, when the piston 112 further ascends, the exhaust control unit 154 closes the exhaust valve 122 to close the exhaust port 118 (t2 illustrated in FIG. 3). Moreover, an explosion is generated by the combustion action of the combustion chamber 140.

In this way, by combusting the premixed gas in the combustion chamber 140, as described above, the exhaust stroke, the intake stroke, the compression stroke and the combustion stroke are repeated.

Second Embodiment

Hereinafter, a second fuel injection unit 228 and its support structure in a second embodiment of the present disclosure will be described. Since the second embodiment is different from the first embodiment only in the fuel injection unit 228 and its support structure, here, the same configuration as the first embodiment will not be described, and only the fuel injection unit 228 and its support structure of the different configuration will be described.

FIG. 4 is an explanatory diagram for describing a uniflow scavenging 2-cycle engine 200 of the second embodiment. In FIG. 4, of the structure of the uniflow scavenging 2-cycle engine 200, functional units of a control system, configurations above the cylinder block 110b, and the scavenge chamber 126 are not illustrated.

Although the fuel injection unit 228 has substantially the same configuration as the fuel injection unit 128 in the first embodiment, a mixing tube 228a and a mixing tube (pipe unit) 228b into which the active gas and the fuel gas are introduced surround the cylinder 110 in the circumferential direction, in a state of being spaced apart from the cylinder 110 on the radially outer side of the cylinder 110, without coming into contact with the cylinder 110.

Moreover, a base 202 and a support rod 204 are disposed to support the fuel injection unit 228. The base 202 is an annular member fixed to the base 114a on one end side in the stroke direction of the cylinder 110, and has an outer diameter larger than that of the cylinder 110, and the rod 112a of the piston 112 is inserted into the base 202. Further, a step is formed on a lower surface 202b of the base 202 to fit the base 114a, and an upper surface 202a of the base 202 is substantially horizontally maintained.

The support rod 204 is a rod-like member which is fixed to the upper surface 202a of the base 202, its one end is fixed to the base 202 and the other end supports the mixing tube 228b. A circulation tube 228d of the fuel injection unit 228 is fixed to the mixing tube 228a at one end and is fixed to the mixing tube 228b at the other end.

That is, the fuel injection unit 228 is fixedly supported by the base 202 via a support rod 204 and does not come into contact with the cylinder 110. The cylinder 110 is supported by the support unit 114, and when releasing the support of the support unit 114, it is possible to pull the cylinder 110 upward without detaching the fuel injection unit 228. For this reason, detachment of the cylinder 110 becomes easier during maintenance or the like, and the workability is improved.

Although the embodiments of the present disclosure have been described with reference to the accompanying drawings, the present disclosure is not limited to such embodiments. It is obvious to those skilled in the art that various changes and modifications are conceivable within the scope described in the claims, and those are understood as naturally belonging to the technical scope of the present disclosure.

For example, in the above-described embodiments, although the description has been given of a case where the mixing tubes 128a and 128b are fixed to the cylinder 110 by both the G-coupling structure and the rings 156a and 156b, the mixing tubes may be fixed to the cylinder 110 by one of the G-coupling structure and the rings 156a and 156b.

Further, in the above-described embodiments, although the description has been given of a case where the fuel injection units 128 and 228 are configured to include the mixing tubes 128a, 128b, 228a and 228b, the switching valve 128c, the circulation tubes 128d and 228d, and the injection port 128e, any configuration may be adopted as long as the injection port 128e is located on the radially outer side of the cylinder 110 to inject the fuel gas to the active gas which is sucked into the scavenge port 124.

Further, in the above-described embodiment, although the description has been given of a case where the injection port 128e is located on the radially outer side of the cylinder 110 between the adjacent scavenge ports 124, the injection port 128e may be located in front of the scavenge port 124 and may be located to be shifted to one end side or the other end side in the stroke direction of the piston 112 from the scavenge port 124.

Further, in the above-described embodiment, the description has been given of a case where the premixed gas of the fuel gas and the active gas is ejected from the fuel injection unit 128 toward the active gas which flows toward the scavenge ports 124 from the scavenge chamber 126. However, a configuration may be adopted in which only the fuel gas is injected from the fuel injection unit 128 to generate the premixed gas by being mixed with the active gas in the cylinder 110.

INDUSTRIAL APPLICABILITY

The present disclosure can be utilized in a uniflow scavenging 2-cycle engine which combusts the premixed gas generated by injecting the fuel gas into the active gas sucked from the scavenge port.

The invention claimed is:
1. A uniflow scavenging 2-cycle engine comprising:
a cylinder in which a combustion chamber is formed;
a piston which slides within the cylinder;
a scavenge port which is provided on one end side in a stroke direction of the piston in the cylinder to suck an active gas into the combustion chamber in accordance with the sliding movement of the piston; and
a fuel injection unit which has an injection port located on the outside of the cylinder, and injects a fuel gas into the active gas sucked into the scavenge port,
wherein the fuel injection unit has a pipe unit into which the fuel gas is introduced, and
the pipe unit is spaced apart from the cylinder on the radially outer side of the cylinder, surrounds the cylinder in the circumferential direction, and is supported independently of the cylinder.
2. The uniflow scavenging 2-cycle engine of claim 1, wherein a plurality of the scavenge ports are provided to be spaced apart from each other in a circumferential direction of the piston, and
the injection port of the fuel injection unit is located such that it is spaced apart from a partition wall between the adjacent scavenge ports on the radially outer side of the cylinder.

* * * * *